(12) United States Patent
Kaphengst et al.

(10) Patent No.: US 10,067,402 B2
(45) Date of Patent: Sep. 4, 2018

(54) WINDOW SYSTEM FOR A PASSENGER COMPARTMENT OF A VEHICLE

(71) Applicant: GM GLOBAL TECHNOLOGY OPERATIONS LLC, Detroit, MI (US)

(72) Inventors: Michael R. Kaphengst, Leonard, MI (US); Jamie L. Hamilton, Clinton Township, MI (US); Michael P. Van De Velde, Shelby Township, MI (US); Lara Jane S. Hadlocon, Sterling Heights, MI (US); Breitner S. Marczewski, Shelby Township, MI (US); Dorel M. Sala, Troy, MI (US); Ramona L. Winarski, Rochester Hills, MI (US); Anthony J. Stefanski, Utica, MI (US)

(73) Assignee: GM Global Technology Operations LLC, Detroit, MI (US)

(*) Notice: Subject to any disclaimer, the term of this patent is extended or adjusted under 35 U.S.C. 154(b) by 91 days.

(21) Appl. No.: 15/235,690

(22) Filed: Aug. 12, 2016

(65) Prior Publication Data

US 2018/0046058 A1    Feb. 15, 2018

(51) Int. Cl.
*G02F 1/29* (2006.01)
*B60J 1/00* (2006.01)
*B60J 3/04* (2006.01)

(52) U.S. Cl.
CPC ............ *G02F 1/293* (2013.01); *B60J 1/00* (2013.01); *B60J 3/04* (2013.01)

(58) Field of Classification Search
CPC ............ G02F 1/293; B60J 1/00; B60J 3/04
See application file for complete search history.

(56) References Cited

U.S. PATENT DOCUMENTS

| | | | |
|---|---|---|---|
| 7,970,172 B1 * | 6/2011 | Hendrickson | B60J 3/04 280/735 |
| 8,830,141 B2 | 9/2014 | Seder et al. | |
| 2006/0158715 A1 * | 7/2006 | Furusawa | B60J 3/04 359/265 |

* cited by examiner

Primary Examiner — Joseph P Martinez
(74) Attorney, Agent, or Firm — Quinn IP Law

(57) ABSTRACT

A window system for a passenger compartment of a vehicle includes a transparent window having a window treatment, an incident light monitoring subsystem, an incident light management subsystem and a controller. The incident light monitoring subsystem monitors incident light transmitted into the passenger compartment, determines a field of view of a passenger and determines an intensity of the incident light relative to the field of view of the passenger. The incident light management subsystem individually controls a plurality of light projectors to project a light beam that interacts with a subsection of the window treatment to modulate light transparency of one of the subsections of the window based upon the intensity of the incident light in relation to a field of view of the passenger.

16 Claims, 2 Drawing Sheets

WINDOW SYSTEM FOR A PASSENGER COMPARTMENT OF A VEHICLE

TECHNICAL FIELD

This disclosure relates to vehicle windows, and light transmission therethrough.

BACKGROUND

Vehicles include passenger compartments that include windows that are formed from glass or other suitable substances. Windows function as impermeable transparent windscreens to separate passengers from the elements during operation. Incident light from the sun or external sources such as headlamps of on-coming vehicles may cause glare and otherwise impair vision of the driver. Incident light induces a heat load on the passenger compartment that may be advantageous at cold ambient temperatures and disadvantageous at warm ambient temperatures. Vehicles are presently equipped with manual or semi-automatic sun visors to block or otherwise minimize transmission of incident light into a portion of a passenger compartment. Such devices can completely obstruct vision and do not provide automatic or complete sun blocking coverage at all positions or orientations in the passenger compartment.

SUMMARY

A window system for a passenger compartment of a vehicle is described, and includes a transparent window having a window treatment disposed thereon, an incident light monitoring subsystem, an incident light management subsystem and a controller. The incident light monitoring subsystem is disposed to monitor incident light transmitted into the passenger compartment, determine a field of view of a passenger in the passenger compartment and determine an intensity of the incident light relative to the field of view of the passenger. The incident light management subsystem includes a plurality of individually controllable light projectors, wherein each of the light projectors is configured to project a light beam that interacts with a subsection of the window treatment to modulate transparency of a corresponding subsection of the window. The incident light monitoring subsystem is disposed to determine a location of a passenger of the vehicle and also determine the intensity of incident light in relation to a field of view of the passenger. The incident light management subsystem is disposed to control the light projectors to interact with the window treatment to modulate light transparency of one of the subsections of the window based upon the intensity of the incident light in relation to the field of view of the passenger.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. Furthermore, the drawings are in simplified form and are not to precise scale. For purposes of convenience and clarity only, directional terms such as top, bottom, left, right, inner, outer, rear and front may be used with respect to the drawings. These and similar directional terms descriptive in nature and are not to be construed to limit the scope of the disclosure in any manner. Furthermore, the teachings may be described herein in terms of functional and/or logical block components and/or various processing steps. It should be realized that such block components may be composed of any number of hardware, software, and/or firmware components configured to perform the specified functions. Furthermore, the disclosure, as illustrated and described herein, may be practiced in the absence of any element which is not specifically disclosed herein.

Figure 1:
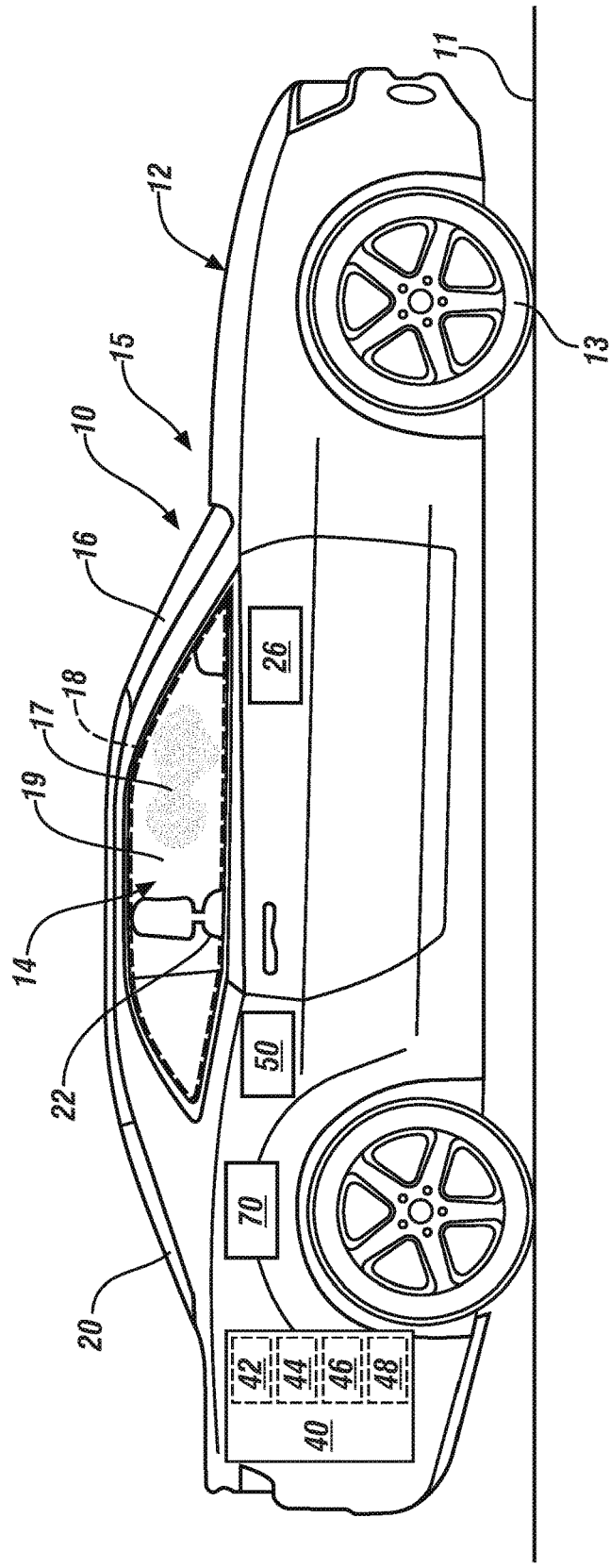
FIG. 1 schematically illustrates a vehicle that includes a vehicle body having a plurality of windows that are disposed to envelop a passenger compartment, an incident light monitoring subsystem, and an incident light management subsystem, in accordance with the disclosure.

Referring to the drawings, wherein like reference numerals correspond to like or similar components throughout the several Figures, FIG. 1, consistent with embodiments disclosed herein, illustrates a side schematic view of a vehicle 10 that is positioned relative to a road surface 11. The vehicle 10 includes a vehicle body 12 having a plurality of windows 15, a controller 50, an incident light monitoring subsystem 40 and a passenger compartment incident light management subsystem (LMS) 70. The windows 15 are disposed around an outer periphery of a passenger compartment 14. The windows 15 may include, by way of non-limiting examples, a windshield 16, side windows including a front passenger window 18 and a front driver window 19, a rear window 20 and windows on the roof of the vehicle 10. The windows 15 may also include left and right rear passenger windows and intermediate windows in some embodiments (not shown). Each of the windows 15 is preferably fabricated from some form of transparent material, such as tempered glass or laminated glass. A window treatment 17 is applied to each of the windows 15, wherein the window treatment 17 may be in the form of a laminate layer that is disposed onto an interior surface of the windows 15. Alternatively, the window treatment 17 may be a laminate layer that is interposed between transparent laminate layers of the windows 15. In one embodiment, the window treatment 17 is in the form of a transparent material with embedded nanoparticles, wherein the nanoparticles are selected for their capability of scattering selected wavelengths of the light spectrum while permitting other wavelengths to pass through unaffected. As such, the window 15 with the applied window treatment 17 remains transparent except at locations where a light beam is applied. At such locations where a light beam is applied, a single-color display or pattern becomes visible on the window 15, and is preferably sufficient to render the window 15 translucent at that location. Application of a suitable light beam is described with reference to FIG. 3.

The vehicle body 12 defines six body sides, including a front end, a rear end, a left side, a right side, a top portion that may include a vehicle roof, and an underbody portion. The passenger compartment 14 is contained within the vehicle body 12 and includes one or more passenger seats, including a driver seat 22. Some vehicles may also include a front passenger seat, middle row passenger seat(s), rear passenger seat(s), and/or another suitably arranged seat, depending upon the configuration of the passenger compartment 14.

The vehicle 10 preferably includes a drivetrain that includes a power plant that mechanically couples via a geartrain and driveline to one or a plurality of wheels 13 to transfer mechanical power to the road surface 11 to effect tractive effort. The power plant may include, by way of non-limiting examples, an internal combustion engine, a hybrid-electric powertrain, an electrically-powered motor, or another alternative type of power plant. The geartrain may include an automatic transmission rotatably coupled to a differential or transaxle, or another suitable geartrain configuration. The vehicle 10 may include, but not be limited to a mobile platform in the form of a commercial vehicle, an industrial vehicle, an agricultural vehicle, a passenger vehicle, various forms of autonomous vehicles, an aircraft, a watercraft, a train, an all-terrain vehicle, a personal movement apparatus, a robot and the like to accomplish the purposes of this disclosure. Operation of the vehicle 10 may be controlled by the controller 50.

The incident light monitoring subsystem 40 includes a light monitoring controller 42 and a plurality of sensors, control routines, calibrations and other elements that are configured to monitor and characterize incident light that transmits through one or more of the windows 15 into the passenger compartment 14 and also to determine a field of view (FOV) of each of the passengers in the passenger compartment 14. The FOV defines the extent of the observable world that may be seen at a point in time. The incident light monitoring subsystem 40 determines an intensity of the incident light relative to the FOV for each of the passengers. These operations are dynamically executed in the light monitoring controller 42 to provide real-time information.

The light monitoring controller 42 includes information that is stored in a non-volatile memory device that is geometrically descriptive of the vehicle architecture as it relates to the passenger compartment 14. Such information preferably includes a three-dimensional description of the passenger compartment 14 including a shape and form of the windshield 16, the side windows including, e.g., the front passenger window 18 and the front driver window 19, and the rear window 20. In one embodiment, the three-dimensional description of the passenger compartment 14 is described in relation to the road surface 11, with longitudinal, lateral and elevation axes defined thereby.

The incident light monitoring subsystem 40 may include an occupant sensing subsystem 44 that is disposed to monitor spatial orientation of each passenger of the vehicle 10, wherein the passenger may be any occupant of the vehicle, including a vehicle operator or driver. This preferably includes detecting and monitoring position(s) of a driver that is situated in a driver seat and other passengers that may be situated in other vehicle seats. Such sensing subsystems may include seat sensors for detecting occupancy and seat position, memory seats and associated controls, seatbelt use sensors, seat track travel sensors, and in-vehicle camera systems. Such sensors and associated control routines may be employed to characterize seat position and spatial orientation of each passenger employing linear, angular and/or multi-axis sensing configurations.

The incident light monitoring subsystem 40 may include a vehicle sensing subsystem 46 that is disposed to monitor spatial orientation of the vehicle 10. The vehicle sensing subsystem 46 may include, or be in communication with an on-vehicle global positioning system (GPS), which may be interrogated to determine direction of vehicle travel and vehicle elevation. The vehicle sensing subsystem 46 may include, or be in communication with an on-vehicle vehicle dynamics system that includes gyroscopic sensors, accelerometers and other devices that may be employed to determine vehicle speed (or zero speed) and acceleration, and vehicle attitude including yaw, pitch and roll.

The incident light monitoring subsystem 40 may include an incident light sensing subsystem 48 that is disposed to monitor orientation and intensity of incident light in relation to the vehicle 10. The incident light sensing subsystem 48 may include devices, control routines and predetermined calibrations indicating the position of the sun relative to the horizon for the vehicle location in relation to the date and time of day. The incident light sensing subsystem 48 may include devices and subsystems for monitoring weather conditions, including ambient temperature, presence of snow and other glare-producing conditions. The incident light sensing subsystem 48 may include a headlamp monitoring system that is disposed to monitor intensity of headlamps of an oncoming vehicle. The incident light sensing subsystem 48 may include other devices that are configured to monitor intensity of light that is generated from a stationary light source, such as a street lamp. The incident light sensing subsystem 48 may include a photometric sensor for monitoring intensity of the incident light that transmits through one of the windows 15 into the passenger compartment 14. Photometric sensors may include devices and systems for monitoring light in the visual spectrum, and may include, in one embodiment, a filtered silicon photodiode device that generates a signal that relates to luminance (in units of $cd/m^2$), illuminance (in units of lux), luminous intensity (in units of cd), or another suitable measurement system.

The incident light monitoring subsystem 40 employs three-dimensional spatial geometric relationships, which are dynamically executed in the light monitoring controller 42, to determine the intensity of incident light relative to the FOV of each of the passengers based upon information from the occupant sensing subsystem 44, the vehicle sensing subsystem 46 and the incident light sensing subsystem 48. Development and implementation of spatial geometric relationships are known to those skilled in the art, and thus not described in further detail herein.

The vehicle 10 may also include a user interface 26, which allows the driver or another passenger to interact with the controller 50 to adjust or manually control the LMS 70.

While one user interface 26 is shown, the term "user interface" can include, but is not limited to, a touch screen, a physical keyboard, a mouse, knob(s), toggle switch(es), a microphone, and/or a speaker. In one embodiment, the touch screen is responsive to tactile inputs from a user, including but not limited to pointing, tapping, dragging, two-finger pinching, two-finger expanding, etc. The user interface 26 may be employed by one of the passengers to provide a control input to the LMS 70 to control operation thereof.

Figure 2:
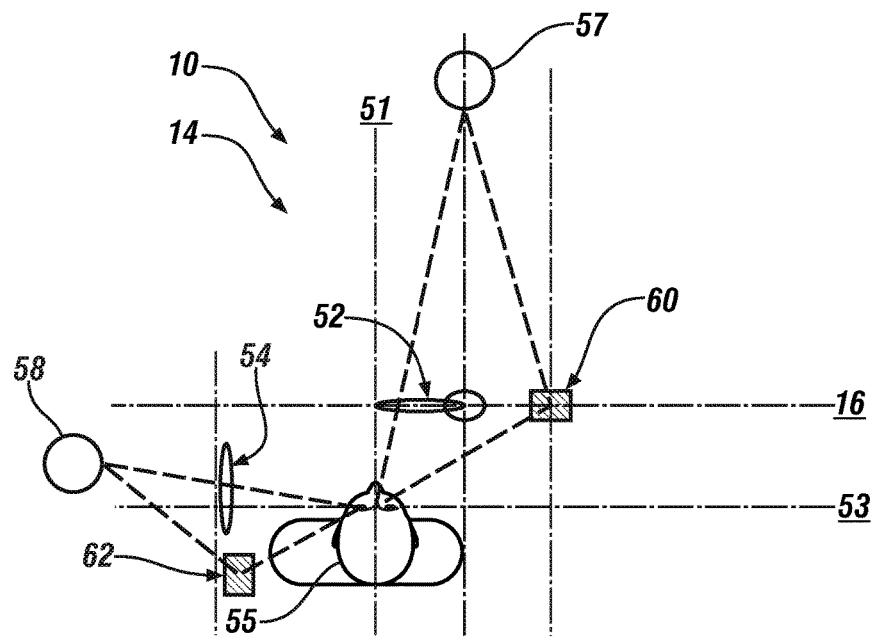
FIG. 2 schematically illustrates a top-view of a portion of the passenger compartment of the vehicle, including a windshield, a vehicle driver, and in-vehicle camera, in accordance with the disclosure.

FIG. 2 schematically illustrates a top-view of a portion of the passenger compartment 14 of the vehicle 10 including windshield 16 to further describe elements related to the incident light monitoring subsystem 40. A vertical axis 51 that is collinear with a longitudinal axis of the vehicle 10 and a horizontal axis 53 that is collinear with a lateral axis of the vehicle 10 are indicated. A vehicle driver 55 is indicated. The vehicle 10 includes an in-vehicle camera 60 that is mounted near the windshield 16, such as on a rearview mirror (not shown). Another photo-sensing device 62 may be employed, and may be mounted in the passenger compartment 14 at another location. The in-vehicle camera 60 and the photo-sensing device 62, when employed, are mounted in locations in the passenger compartment 14 that are suitable for detecting and monitoring one or more external light sources and the FOV of the passengers including the driver and other passengers. A primary external light source 57, such as a sun, and a shade element 52 are indicated in relation to the vehicle driver 55, or alternatively in relation to another passenger (not shown). Under certain circumstances, there may be a secondary external light source 58 that enters the FOV of the vehicle driver 55, and an associated second shade element 54. The secondary external light source 58 may be a reflection of the primary external light source 57, or may originate from a second source. The in-vehicle camera 60 is preferably a digital device that includes an image acquisition sensor, an encoder, and a camera controller. The camera 60 is capable of capturing digitized images representing the FOV at a predetermined resolution. The image acquisition sensor of the camera 60 communicates with the encoder that communicates with the camera controller, which executes digital signal processing (DSP) on the digitized images. The camera 60 is fixedly mounted in the passenger compartment 14, and has a frame of reference in the form of an xyz-coordinate reference having a point of origin associated with the camera 60, with the x and y coordinates defined by the vehicle and the road surface 11, and the z coordinate orthogonal thereto. The camera controller includes executable routines that enable it to identify a location of an external light source, e.g., in context of the incident light transmitting through the windshield 16 based upon the digitized images generated by the camera 60. The camera controller may also include executable routines that enable it to identify the location and associated FOV of the driver 55 by employing pattern recognition routines and light detection routines based upon the digitized images generated by the camera 60. The camera 60 and the photo-sensing device 62 communicate with the light monitoring controller 42.

Referring again to FIG. 1, the passenger compartment incident light management subsystem (LMS) 70 is configured to interact with the window treatment 17 of the windows 15 to selectively modulate the transparency of the windows 15. As described with reference to FIG. 3, the LMS 70 is controllable to interact with the window treatment 17 to modulate transparency of one or more spatially-defined subsections of one of the windows 15, wherein the transparency is modulated based upon the intensity of the incident light transmitting through the window 15 in relation to the FOV of the passenger, as determined by the incident light monitoring subsystem 40. This includes reducing the transparency to reduce the intensity of the incident light transmitting through the window 15 that is in the FOV of one or more of the passengers, with preferential treatment afforded to the driver 55 to reduce, minimize or eliminate visual impairment.

Figure 3:
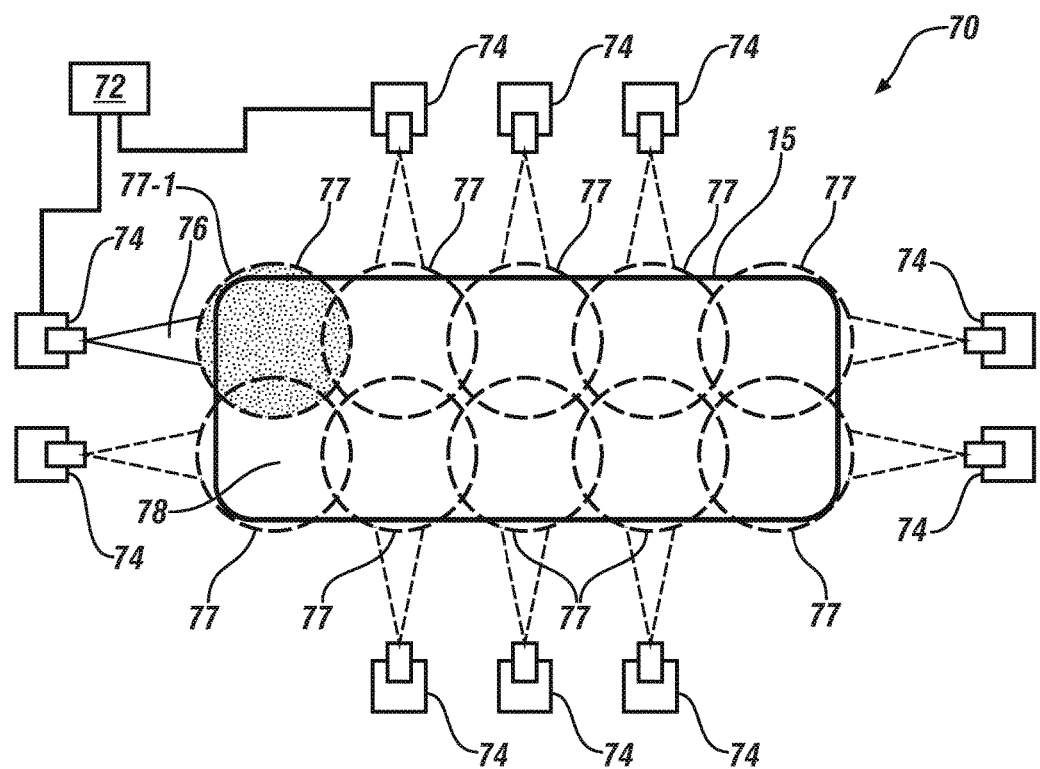
FIG. 3 schematically illustrates one embodiment of elements of a passenger compartment incident light management subsystem that is associated with a single one of the windows of the vehicle, including a plurality of light projectors and an incident light management controller, in accordance with the disclosure.

FIG. 3 schematically shows one embodiment of elements of the LMS 70, wherein the LMS 70 that is shown is associated with a single one of the windows 15. The LMS 70 includes a plurality of light projectors 74 that are in communication with an LMS controller 72. The LMS controller 72 includes executable control routines, calibrations and other elements to individually control each of the plurality of light projectors 74. The light projectors 74 are preferably located proximal to an outer periphery of the window 15 and are in communication with the LMS controller 72. Each of the light projectors 74 includes a light source, e.g., an LED (light-emitting diode) that projects a light beam 76. The light beam 76 may be in the visible spectrum, the infrared spectrum, the ultraviolet spectrum, or a combination thereof. The intensity of the light beam 76 may be controllable. The light beam 76 from each of the light projectors 74 can be projected onto the associated window 15, and thus demarcate a spatially-defined subsection 77 of the window 15. The light beam 76 interacts with the associated window treatment 17 that is disposed on the window 15 within the spatially-defined subsection 77 and thus modulates transparency of the window 15 within the spatially-defined subsection 77. Each of the spatially-defined subsections 77 of the window treatment 17 can become translucent or opaque when exposed to the light beam 76.

The light projectors 74 are individually controllable in response to activation signals that are communicated from the LMS controller 72. As shown, one of the light projectors 74 is activated, and a corresponding one of the light beams 76 is indicated, along with a corresponding spatially-defined portion 77 of the associated window 15 that has been subjected to modulated or reduced transparency. As shown, the other light projectors 74 are not activated. Thus, the corresponding spatially-defined remaining subsection 78 of the associated window 15 remains transparent and is unaffected by the operation of the LMS 70.

Adjacent spatially-defined subsections 77 may overlap. The spatially-defined subsections 77 are shown as being circular in one embodiment. The spatially-defined subsections 77 are each defined by the shape of the light beam 76 and the orientation of the light projector 74, and thus may be any suitable shape including, e.g., oval, square, rectangular, trapezoidal, etc. In operation, when all of the plurality of light projectors 74 are all deactivated, the window 15 is transparent. When a single one or multiple ones of the plurality of light projectors 74 is activated to project light onto a subsection of the surface of the window, e.g., as indicated by subsection 77-1, that subsection of the window 15 modulates its light transmittance.

The modulated or reduced transparency and associated reduced light transmittance reduces intensity of glare and likelihood of impaired vision that may be caused by an external light source. The reduced transparency may be dynamically controlled, and can be localized to a specific one of the subsections 77, localized to an entire area of a selected one of the windows 15, or encompass all or selected subsections 77 of all of the windows 15 of the vehicle.

Referring again to FIG. 1, with continued reference to FIGS. 2 and 3, the controller 50 monitors inputs from the incident light monitoring subsystem 40 to determine an intensity of the incident light originating from either or both the primary external light source 57 and the secondary external light source 58 relative to a field of view of the passenger 55 and determines, via the incident light monitoring subsystem 40, the intensity of incident light in relation to the field of view of the passenger 55. The controller 50 operates to control the incident light management subsystem 70 to interact with the window treatment 17 to reduce the transparency of one or more of the plurality of subsections 77 of one or more of the windows 15 based upon the intensity of the incident light in relation to the field of view of the passenger 55.

In addition, the controller 50 monitors inputs from the incident light monitoring subsystem 40 to determine an intensity of the incident light originating from either or both the primary external light source 57 and the secondary external light source 58 relative to fields of view of a plurality of passengers (not shown) and determines, via the incident light monitoring subsystem 40, the intensity of incident light in relation to the fields of view of the plurality of passengers. The controller 50 operates to control the incident light management subsystem 70 to interact with the window treatments 17 of one or more of the windows to reduce the transparency of one or more of the plurality of subsections 77 of one or more of the windows 15 based upon the intensity of the incident light in relation to the fields of view of the plurality of passengers.

In addition to relieving visual impairment caused by the sun or oncoming glare from external light sources, other benefits that may accrue to a vehicle operator include the ability to eliminate manual sun visors, rear shades, and other components.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A window system for a passenger compartment of a vehicle, comprising:
   a transparent window including a window treatment;
   an incident light monitoring subsystem being disposed to monitor incident light transmitted through the window into the passenger compartment, being disposed to monitor a spatial location of a passenger in the passenger compartment, and being disposed to determine an intensity of the incident light relative to a field of view of the passenger;
   an incident light management subsystem that is disposed to interact with the window treatment to reduce transparency of a plurality of subsections of the window, wherein the incident light management subsystem comprises a plurality of individually controllable light projectors that are in communication with the controller; and
   a controller, in communication with the incident light monitoring subsystem and the incident light management subsystem, the controller including an instruction set that is executable to:
      determine, via the incident light monitoring subsystem, the field of view of the passenger of the vehicle,
      determine, via the incident light monitoring subsystem, the intensity of incident light in relation to the field of view of the passenger, and
      control the incident light management subsystem to interact with the window treatment to reduce the transparency of one of the plurality of subsections of the window based upon the intensity of the incident light in relation to the field of view of the passenger.

2. The window system of claim 1, wherein the individually controllable light projectors are disposed to project a light beam onto a spatially-defined subsection of the window.

3. The window system of claim 2, wherein the light beam interacts with the window treatment that is disposed on the window within the spatially-defined subsection to reduce the transparency of the window within the spatially-defined subsection.

4. The window system of claim 2, wherein the light beam interacts with the window treatment that is disposed on the window within the spatially-defined subsection to reduce transmission of incident light into the passenger compartment through the spatially-defined subsection.

5. The window system of claim 1, wherein the incident light monitoring subsystem includes a photometric sensor.

6. The window system of claim 1, wherein the incident light monitoring subsystem includes a camera.

7. The window system of claim 1, wherein the window comprises a windshield.

8. The window system of claim 1, wherein the window comprises one of a side window or a rear window.

9. The window system of claim 1, wherein the window treatment is disposed on a surface of the window.

10. The window system of claim 1, wherein the window treatment is interposed between laminate layers of the window.

11. The window system of claim 1, wherein the window treatment comprises a laminate layer composed of transparent material having embedded nanoparticles that are selected to scatter selected wavelengths of the light spectrum while permitting other wavelengths to pass through unaffected in response to a light beam projected thereon.

12. The window system of claim 1, wherein the passenger comprises a vehicle driver.

13. A window system for a passenger compartment of a vehicle, comprising:

a plurality of windows, each including a window treatment;

an incident light monitoring subsystem being disposed to monitor incident light transmitted through the plurality of windows into the passenger compartment, being disposed to monitor spatial locations of passengers in the passenger compartment, and being disposed to determine intensity of the incident light relative to fields of view of the passengers;

an incident light management subsystem that is disposed to interact with the window treatment of each of the plurality of windows to reduce transparency thereof, wherein the window treatment comprises a laminate layer composed of transparent material having embedded nanoparticles that are selected to scatter selected wavelengths of the light spectrum while permitting other wavelengths to pass through unaffected in response to a light beam projected thereon; and a controller, in communication with the monitoring subsystem and the incident light management subsystem, the controller including an instruction set that is executable to:

determine, via the incident light monitoring subsystem, the fields of view of the passengers of the vehicle, determine, via the incident light monitoring subsystem, the intensity of incident light in relation to the fields of view of the passengers, and control the incident light management subsystem to interact with the window treatment of one or more of the windows to reduce the transparency based upon the intensity of the incident light in relation to the fields of view of the passengers.

14. The window system of claim 13, wherein the light projectors are individually controllable devices that are disposed to project light beams onto the spatially-defined subsections of each of the windows.

15. The window system of claim 14, wherein each of the projected light beams interacts with the window treatment that is disposed on the window within one of the spatially-defined subsections to reduce the transparency within the spatially-defined subsection.

16. A method for managing transmission of incident light through a window of a passenger compartment of a vehicle, comprising:

applying a window treatment on the window, including applying a laminate composed of transparent material having embedded nanoparticles that are selected to scatter selected wavelengths of the light spectrum while permitting other wavelengths to pass through unaffected in response to a light beam projected thereon;

monitoring incident light transmitted through the window into the passenger compartment, monitoring a spatial location of a passenger in the passenger compartment;

determining field of view of the passenger of the vehicle based upon the spatial location of the passenger;

determining an intensity of the incident light relative to a field of view of the passenger; and controlling an incident light management subsystem that is disposed to interact with the window treatment to reduce the transparency of one of a plurality of subsections of the window based upon the intensity of the incident light in relation to the field of view of the passenger.

\* \* \* \* \*